United States Patent [19]

Aldenhoven

[11] 3,737,600

[45] June 5, 1973

[54] TAPE RECORDER CONTROL WITH SHAFT ROTATION SENSING MECHANISM FOR ACTUATING SWITCH

[75] Inventor: Ghislanus Matheus Anthonius Maria Aldenhoven, Emmasingel, Eindhoven, Netherlands

[73] Assignee: U.S. Philips Corporation, New York, N.Y.

[22] Filed: Sept. 27, 1971

[21] Appl. No.: 183,773

[30] Foreign Application Priority Data

Oct. 1, 1970 Netherlands ........................7014411

[52] U.S. Cl. .............200/61.39, 200/52 R, 200/17 R

[51] Int. Cl. ..............................................H01h 3/16

[58] Field of Search ..................200/38, 39 R, 61.39, 200/17 R, 52 R

[56] References Cited

UNITED STATES PATENTS

| | | | |
|---|---|---|---|
| 3,231,695 | 1/1966 | Greenhut | 200/61.39 |
| 2,846,534 | 8/1958 | Morrill | 200/61.39 |
| 3,489,015 | 1/1970 | Harris | 200/39 R X |
| 3,598,214 | 8/1971 | Harris | 200/38 R X |
| 3,312,916 | 4/1967 | Hoover | 200/61.39 X |
| 2,461,298 | 2/1949 | Stephenson | 200/52 R X |
| 2,606,093 | 8/1952 | Reason | 200/52 R X |
| 3,423,546 | 1/1969 | Barnes | 200/52 R |

*Primary Examiner*—J. R. Scott
*Attorney*—Frank R. Trifari

[57] ABSTRACT

A mechanism for initiating a switching function in an apparatus for recording and/or playing back magnetic recordings on and/or from a recording tape has a continuously rotating first component and a rotatably mounted disc, co-axially arranged with respect to the first component, which rotates only during tape transport. The disc has an internally tooth rim portion. A cam wheel is interposed between the disc and the first component and is eccentrically arranged. The cam wheel has an annular hub portion which is provided with external teeth which are locally held in engagement with the internal teeth of the rim portion by means of an axially projecting pin provided on the first component part. The cam wheel rotates in one direction during tape transport performing an eccentric movement, and rotates in the opposite direction when the tape is in the stationary condition, thus operating a switch for switching off or changing over the tape drive.

6 Claims, 3 Drawing Figures

Figure 1:
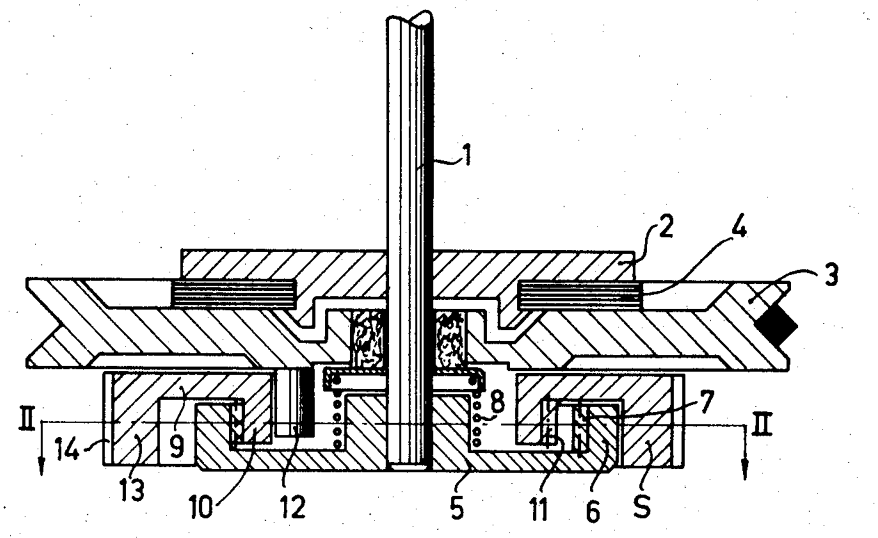

INVENTOR.
GHIELANUS M.A.M. ALDENHOVEN

BY Frank R. Trifari
Agent

INVENTOR.
GHIELANUS M.A.M. ALDENHOVEN
BY
Frank R. Trifari
Agent

TAPE RECORDER CONTROL WITH SHAFT ROTATION SENSING MECHANISM FOR ACTUATING SWITCH

The invention relates to a mechanism for initiating a switching function in an apparatus for recording and/or playing back magnetic recordings on and/or from a recording tape. The apparatus includes at least two coaxially arranged rotatable component parts one of which rotates continously during operation and a second one rotates only during tape transport. The device includes a switch by means of which a driving member for the tape transport may be switched off or changed over.

Such a switching device is described in German Pat. No. 1,286,773. In this known device The first component part, which rotates continuously during operation, is driven by means of an additional capstan. Conventionally a capstan and pressure roller system are provided near one of the winding spindles of the recording and/or playback apparatus. This additional capstan is arranged near the other winding spindle. The second component part, which rotates only during tape transport, is driven by a friction disc which is coupled to the said other winding spindle via a friction clutch. The two component parts are mounted on an idler spindle interposed between the latter winding spindle and the additional capstan. The switching element is in the form of an arm which, at one end, is pivotably mounted on the idler spindle and at the other end carries two wheels one of which co-operates with the component part which continuously rotates, whilst the other wheel cooperates with the second component part which rotates only during tape transport. During the rotation of the component part which rotates only during tape transport the switch arm, which is driven in a given direction, abuts a stop, whilst in the stationary condition of the recording tape and hence of the second component part the switch arm is driven in the opposite direction so as to directly operate the switch for switching off or changing over the apparatus.

The known device is comparatively complicated and expensive and owing to its disposition it is restricted to a given location in the recording and/or playback apparatus.

It is an object of the invention to obviate these disadvantages. Accordingly the invention provides in that the second component part, which rotates only during tape transport, comprises a disc having a rim portion which extends toward the first component part which continuously rotates during operation and is internally provided with teeth. The switching element is a cam wheel which is disposed eccentrically with respect to the two co-axially arranged component parts and therebetween. It has an annular hub portion which extends towards the first-mentioned disc and is located internally of the rim portion of this disc having externally provided teeth. An axially projecting pin which is in contact with the inner circumference of the annular hub portion of the switching element and is carried by the first component for holding the teeth on the rim and hub portion in engagement with one another. The cam wheel thus continuously rotates during tape transport and simultaneously performs an eccentric movement. When the tape is stationary the cam wheel rotates in the opposite direction. Means are provided for initiating the switching function when the element rotates in the opposite direction. A switching device is thereby provided having a minimum number of component parts and hence is inexpensive but reliable and capable of use in more locations within the apparatus.

A suitable embodiment of the invention provides that the cam wheel is provided with external ratchet teeth and the means for initiating the switching function include a pawl cooperating with the ratchet teeth. When the switching element is driven in the operating direction, the pawl slides over the ratchet teeth and when the element is driven in the opposite direction the pawl is arrested and displaced by these teeth so as to operate the switch. The pawl preferably engages on one of the contact springs of the switch.

Another embodiment of the invention has a lever displaceable in a plane parallel to the plane in which the switching element moves. The lever has an end face which extends towards the switching element and is spaced from the outer circumference of this element. An elastic element, which has a freely movable end portion in contact with the outer circumference of the cam wheel is carried by the lever. When the cam wheel is driven in the said first direction the elastic element is lifted from the lever. When the cam wheel is driven in the opposite direction, the elastic element is moved into wedge-shaped space defined by the end face of the lever and the circumference of the cam wheel. The cam wheel, under the influence of its eccentric movement, pushes the end portion of the elastic element against the end face of the lever so as to displace the lever, when the cam wheel is driven in the opposite direction, thus initiating the switching function. The lever is preferably pivotably arranged and loaded by a first spring tending to pivot the lever and its end face in a direction towards the cam wheel. A second pivotable lever is provided which has an end forming a stop for the first lever. When when the cam wheel is driven in the first direction, the stop prevents the pivotal movement of the first lever. When the end portion of the elastic element is pushed back by the eccentrically moving cam wheel, the first lever is pivoted against the action of the first spring and is disengaged from the stop end of the second lever. The second lever thereafter pivoted under the influence of another spring and the end of this second lever remote from the stop end operates the switch.

Figure 2:
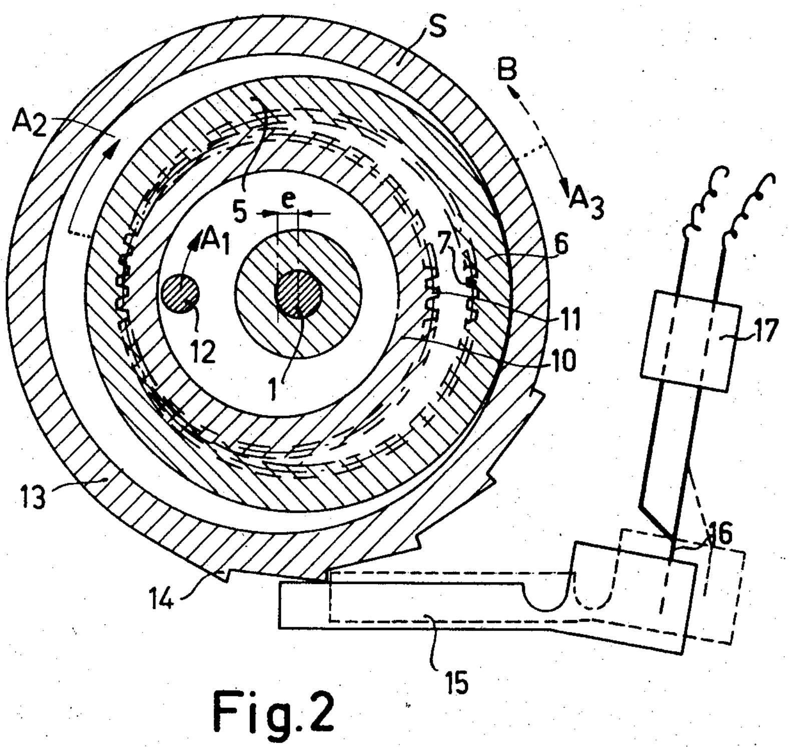
Figure 3:
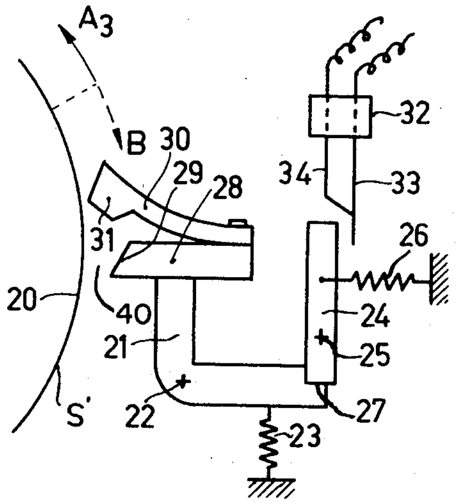
Figure 4:
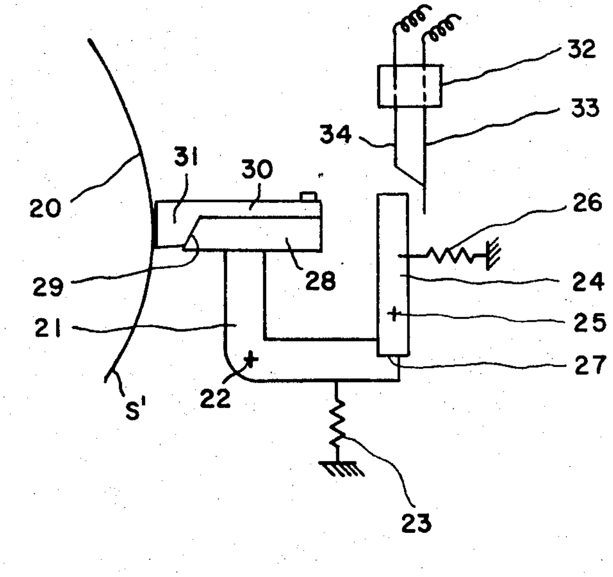
Figure 5:
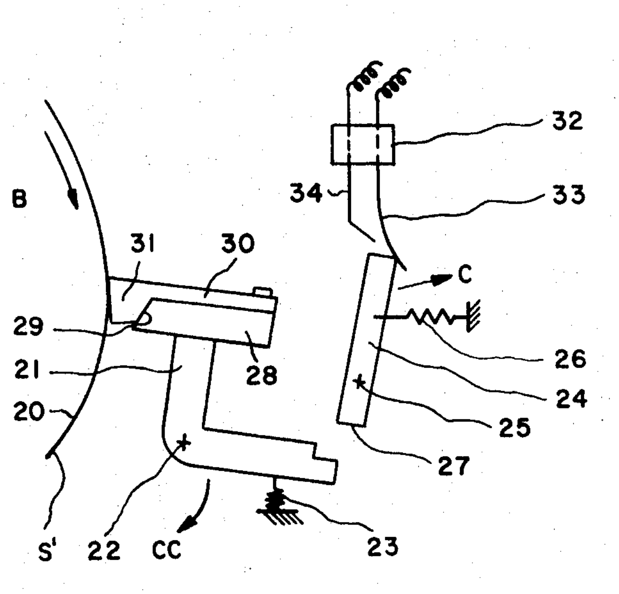

Embodiments of the invention will now be described, by way of example, with reference to the accompanying diagrammatic drawings, in which:

FIG. 1 is a longitudinal sectional view of a switching device according to the invention, FIG. 2 is a cross-sectional view taken on the line II—II of FIG. 1, FIG. 3 shows a modified embodiment of the switching device in one of its operative modes, FIG. 4 shows the embodiment of FIG. 3 in another of its operative modes, and FIG. 5 shows the same embodiment of FIGS. 3 and 4 in a further operative mode.

The switching device shown in the drawings is intended to be used in an apparatus for recording and/or playing back magnetic recordings on/or from a recording tape This tape may be accommodated in a cassette, the tape ends being secured to winding cores which come to a standstill when the tape end is reached. Such an apparatus is provided with at least one first component part which continuously rotates during operation and is driven through suitable transmission means by a drive member, for example a drive motor which forms part of the apparatus, and with a second component part which rotates only during tape transport, such as a turntable on which a winding core may be placed or some element which is in driving connection with such a turntable.

In the embodiment shown in FIGS. 1 and 2 such an element which is adapted to be put in driving connection with a turntable of the apparatus, not shown, takes the form of a spindle 1 to which a disc 2 is secured. A pulley 3 which during operation rotates continuously is mounted for free rotation on the spindle 1, a slipping clutch, in the embodiment shown a friction clutch 4, being interposed between the disc 2 and the pulley 3. During operation and when the tape is not impeded in its movement the pulley 3 through the friction clutch 4 drives the disc 2 and hence the spindle 1, which in turn drives the turntable on which a reel of tape has been placed.

To the lower end of the spindle 1 there is secured a second disc 5 which has a rim portion 6 which faces the pulley 3 and is internally provided with teeth 7. A compression spring 8 arranged between the pulley 3 and the disc 5 supplies the thrust force required for the operation of the friction clutch 4. The assembly of the spindle 1 and the discs 2 and 5 secured thereto forms the component part which rotates during tape transport but comes to a standstill in the stationary condition of the tape. Between the pulley 3 and the disc 5 there is disposed a wheel S (Switching element) constructed as a combined ratchet and gear wheel which is arranged eccentrically with respect to the spindle 1 and takes the form of a disc 9 which is provided with an annular hub portion 10 which faces the disc 5 and on its outer circumference has teeth 11 part of which are held in engagement with the teeth 7 of the rim portion 6 of the disc 5 by means of a pin 12 which is provided on the pulley and projects axially from the lower surface of the pulley and is in contact with the inner circumference of the hub portion 10.

The wheel S has a rim portion 13 which is provided with ratchet teeth 14 along its entire outer circumference. A pawl 15 co-operates, under the influence of its own resilience with the teeth 14 of the ratchet wheel portion of the wheel S. In the embodiment shown the pawl 15 is secured to one of the contact springs 16 of a switch 17 included in the supply circuit of the drive motor of the apparatus.

It is assumed that during operation the pulley 3 and hence the pin 12 rotate in the direction indicated by an arrow $A_1$ (FIG. 2). In the case of unimpeded tape movement the disc 5 provided with the teeth 7 rotates in the same direction, as is indicated by an arrow $A_2$. The combined movement of the pin 12 on the pulley and the teeth 7 on the disc 5 causes the wheel S to rotate in the same direction, as is indicated by an arrow $A_3$, the pawl 15 sliding over the ratchet teeth 14 so that the switch 17 remains closed. During this rotation the wheel S also performs an eccentric movement, the eccentricity of which is indicated by *e*. When the end of the tape is reached, so that the turntable and hence the spindle 1 and the toothed disc 5 secured thereto come to a standstill, whereas the pulley 3, which continuously rotates in operation, continues rotating, the wheel S will start to rotate in the opposite direction indicated by an arrow B. In this opposite direction of rotation the pawl 15 engages in the teeth 14 of the wheel S as shown in dotted lines so that it is pushed away and the contact 16 is operated in a manner such that the switch 17 is opened and the drive of the apparatus is switched off or changed over.

FIGS. 3, 4 and 5 which relate to a second embodiment of the invention, show only those component parts which are different from the embodiment shown in FIGS. 1 and 2. There is provided a wheel (switching element) S' which is identical to the afore-described wheel S, with the exception that the wheel S' includes a rim portion 20 which has a substantially smooth outer circumference and does not have ratchet teeth. In the case of unimpeded movement of the tape, which condition is shown in FIG. 3, the wheel S' again rotates in the direction indicated by the arrow $A_3$, but in the stationary condition of the tape it rotates in the direction indicated by the arrow B, as shown in FIG. 5, and in this connection it should be noted that these directions are opposite to the direction shown in FIG. 2. However, in the embodiment shown in FIG. 3 it is assumed that the directions of rotation $A_1$ and $A_2$ of the pin 12 and the disc 5 respectively are opposite to the directions shown in FIG. 2.

Opposite the switching element S' there is disposed a first lever 21 which is capable of pivoting about a pivot point 22 in a plane parallel to the plane in which the switching element moves and is loaded by a compression spring 23 which tends to pivot the lever in a direction towards the wheel S', i.e., counterclockwise in FIG. 3. A second lever 24 is capable of pivoting about a pivot point 25 and is loaded by a tension spring 26 which tends to pivot the lever clockwise, i.e., in the direction of arrow C in FIG. 5. The first lever 21 is recessed at one end to receive an end 27 of the lever 24, which end serves as a stop and prevents counter clockwise pivoting of the lever 21. At the other end of the first lever 21 there is a head portion 28 having an end face 29 which faces the circumference of the wheel S' and is spaced therefrom. On the portion 28 there is provided an elastic, preferably rubber., element 30 which has a freely movable end 31 which is in contact with the circumference of the rim 20 of the switching element. During rotation of the switching element in the direction $A_3$ the end 31 is held away from the lever portion 28 by the friction produced between the switching element and this end as is shown in FIG. 3. When the switching element is driven in the direction B the end 31 is moved into a wedge-shaped space 40 defined by the switching element and the end face 29, into the position shown in FIG. 4 after which owing to the eccentric movement of the switching element the end 31 is thrust away to strike the end face 29 as is shown in FIG. 5, so that the lever 21 is pivoted against the action of the spring 23 in the direction of arrow CC, and consequently the second lever 24 is released. The lever 24 then will be pivoted clockwise in the direction C from the position shown in FIG. 3 into the position shown in FIG. 5 by the spring 26 and as a result the end of the lever 24 remote from the stop end 27 will operate one of the contact springs 33, 34 of a switch 32, thus opening the contact therebetween.

We claim:

1. A mechanism for initiating a switching function in a tape recording and playback apparatus comprising, means for driving said tape, switch means for controlling the operation of said driving means, a continuously rotating member mounted on said apparatus, a second member comprising a disc rotatably mounted coaxially with respect to said continuously rotating member for rotational movement during tape transport only, an annular rim portion on the periphery of said disc extending in a direction toward said continuously rotating member, gear teeth arranged internally on said annular rim portion, a cam wheel eccentrically mounted with respect to the axis of said continuously rotating member and said rotatably mounted disc and located between said disc and said continuously rotating member, an annular hub carried by said cam wheel extending in a direction toward said disc and arranged inwardly of the annular rim portion on said disc, a plurality a gear teeth arranged externally on said annular hub for cooperative engagement with said gear teeth on said annular rim portion of said disc so that upon rotational movement of said disc during tape transport said cam wheel will be rotated in a first direction, means carried by said continuously rotating member for constantly maintaining the gear teeth of said hub and of said rim in local engagement so that said cam wheel will rotate continuously and eccentrically in said first direction during tape transport and for causing said cam wheel to rotate in an opposite direction when said disc is stationary, and means cooperating with the outer peripheral edge of said cam wheel for operating said switch means when said cam wheel is rotated in said opposite direction so as to initiate said switching function when said tape and disc are stationary.

2. The mechanism according to claim 1 wherein said means for maintaining the gear teeth of said annular hub and said annular rim in engagement comprises an axially projecting pin carried by said continuously rotating member extending in a direction toward said disc and being in engagement with the inner peripheral edge of said annular hub.

3. The mechanism according to claim 2 wherein said means for operating said switch means comprises a plurality of ratchet teeth externally carried on the outer circumferential edge of said cam wheel, a pawl mounted externally of said cam wheel one end of which cooperating with said ratchet teeth so as to ride over said teeth when the wheel rotates in said first direction and is arrested and displaced by said teeth when the wheel rotates in said opposite direction, the other end of said pawl cooperating with said switch means so as to cause the switching function when said pawl is displaced.

4. The mechanism according to claim 3 wherein said switch means has a pair of contact springs and wherein said other end of said pawl is in engagement with one of said contact springs.

5. The mechansim according to claim 2 wherein said means for operating said switch means comprises a bell crank lever pivotally mounted externally of said cam wheel, a head portion carried by said bell crank having an end face spaced from the outer circumference of said cam wheel so as to define a wedge-shaped space between said end face and the circumference of said cam wheel, an elastic element carried by said headportion one end of which is freely movable, said end being in contact with said circumference of said cam wheel so that when said cam wheel rotates in said first direction the free end of said elastic element will be held away from said head portion and when said cam wheel rotates in said opposite direction the free end of said elastic element will be moved into said wedge-shaped space so that said bell crank will be pivoted upon eccentric movement of said cam wheel, and means connected to said bell crank for cooperating with said switch means so as to cause the switching function when said bell crank is pivoted.

6. The mechanism according to claim 5 further comprising means connected to said bell crank for urging said head portion in a direction toward said cam wheel, said bell crank being pivoted in an opposite direction upon eccentric movement of said cam wheel, and wherein said means for causing said switching function comprises a second lever pivotally mounted so that one end thereof forms a stop member engaging said bell crank for preventing pivotal movement thereof when said cam wheel rotates in said first direction, means connected to said second lever for urging said stop member into engagement with said bell crank, and another end of said second lever arranged for contact with said switch means to initiate the switching function when said bell crank is pivoted so as to be disengaged from said stop member allowing said second lever to pivot in a direction so that said other end contacts said switch means.

* * * * *